(12) United States Patent
Paul

(10) Patent No.: US 11,030,461 B1
(45) Date of Patent: *Jun. 8, 2021

(54) STORYLINES: GROUP GENERATION BASED ON FACIAL RECOGNITION

(71) Applicant: Facebook, Inc., Menlo Park, CA (US)

(72) Inventor: Debashish Paul, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/919,084

(22) Filed: Jul. 1, 2020

Related U.S. Application Data

(63) Continuation of application No. 16/114,155, filed on Aug. 27, 2018, now Pat. No. 10,748,006.

(51) Int. Cl.
  *G06K 9/00* (2006.01)
  *H04L 12/58* (2006.01)

(52) U.S. Cl.
  CPC ..... *G06K 9/00677* (2013.01); *G06K 9/00288* (2013.01); *H04L 51/32* (2013.01)

(58) Field of Classification Search
  CPC .................. G06K 9/00677; G06K 9/00288
  See application file for complete search history.

(56) References Cited

U.S. PATENT DOCUMENTS

| | | | |
|---|---|---|---|
| 10,536,816 B1 * | 1/2020 | Fox | H04W 4/08 |
| 10,748,006 B1 * | 8/2020 | Paul | G06K 9/00288 |
| 2003/0039380 A1 * | 2/2003 | Sukegawa | G06K 9/00288 |
| | | | 382/118 |
| 2014/0193047 A1 * | 7/2014 | Grosz | G06Q 10/10 |
| | | | 382/118 |

OTHER PUBLICATIONS

Preinterview First Office Action received for U.S. Appl. No. 16/114,155 dated Feb. 12, 2020, 10 pages.
Notice of Allowance received for U.S. Appl. No. 16/114,155 dated Apr. 20, 2020, 20 pages.

* cited by examiner

*Primary Examiner* — Tuan H Nguyen
(74) *Attorney, Agent, or Firm* — FisherBroyles, LLP

(57) ABSTRACT

The disclosed computer-implemented method may include receiving an input indicating that a picture is to be taken using a camera on an electronic device. The method may next include taking the picture with the camera, and storing the associated picture data. Next, the method may include accessing the picture data to recognize the persons in the picture based on facial features associated with those persons. Still further, the method may include creating a group for the recognized persons, where the group is associated with the picture taken by the camera, and generating a collaborative group storyline for the created group that allows members of the group to add stories to the collaborative group storyline. Various other methods, systems, and computer-readable media are also disclosed.

20 Claims, 8 Drawing Sheets

STORYLINES: GROUP GENERATION BASED ON FACIAL RECOGNITION

CROSS-REFERENCE TO RELATED APPLICATION

This application is a continuation of U.S. patent application Ser. No. 16/114,155, filed on Aug. 27, 2018, which application is incorporated by reference herein in its entirety.

BACKGROUND

Current social media applications allow users all over the world to share their thoughts and ideas on various topics. They also allow users to share media including videos, gifs, images and text with each other. Most current social media applications allow users to create posts that are visible to friends and family, or to the public in general. These posts may contain pictures, videos, text or other media content. Those users that can view the post may have the opportunity to like the post, leave a comment, or otherwise react to the post.

In current social media applications, however, if users want to share a post with a specific group of people, they need to manually select the users (e.g., friends and family) that are to be part of that group. Manually selecting the group is tedious and can introduce errors. For example, the user may erroneously select a person with whom they did not intend to share the post. Moreover, users who like to share images or videos in the moment with a specific group do not like to sift through a long list of contacts, selecting those who might want to share in that moment.

SUMMARY

As will be described in greater detail below, the instant disclosure describes methods and systems for creating a social media application group by taking a picture. A user may, for example, take a selfie with two other friends in the picture. The embodiments herein may automatically recognize the user and their two friends using facial recognition, and may create a social media application group that includes the user and their two friends. These three people in the group may then be able to see the picture that was taken, and reply to the picture with comments, pictures, videos, stickers or other media. In some cases, the users in the group may create stories which are shared among the group members. This group can be created easily and automatically, simply by taking a picture. This removes any need for users to initiate creation of a group or manually select which friends, family or other persons are to be part of that group. Rather, the user can take a picture and that picture can trigger multiple actions including identifying the persons in the picture, creating a group for those persons, and generating a post within the group that includes the picture that was taken.

In one example, a computer-implemented method for creating a social media application group by taking a picture may include receiving an input indicating that a picture is to be taken using a camera on an electronic device. The method may next include taking the picture with the camera, and storing the associated picture data. Next, the method may include accessing the picture data to recognize the persons in the picture based on facial features associated with those persons. Still further, the method may include creating a group for the recognized persons, where the group is associated with the picture taken by the camera. The method may also include generating a collaborative group storyline for the created group that allows members of the group to add stories to the collaborative group storyline.

In some examples, the method may further include presenting a prompt to receive user input querying whether the collaborative group storyline is to be created. The method may also include receiving user input indicating that the collaborative group storyline is to be created, and then generating the collaborative group storyline in response to the received user input.

In some examples, the method may further include presenting a prompt to receive user input querying whether persons are to be recognized from the picture data. The method may include receiving user input indicating that the persons in the picture are to be recognized and recognizing the persons in the picture based on facial features associated with those persons.

In some examples, the method may further include determining whether at least one of the recognized persons is a friend of a user who initiated the picture. In some examples, each recognized person in the picture may permitted to add a story to the collaborative group storyline.

In some examples, the picture taken by the camera may be automatically established as a profile picture for the created group. In some examples, friends of the recognized persons in the picture may be permitted to see the collaborative group storyline. In some examples, each recognized person in the image may be permitted to choose which friends to allow to see the collaborative group storyline.

In some examples, at least one level of friends beyond the recognized users' friends may be permitted to view and/or comment on the collaborative group storyline. In some examples, taking the picture with the camera may automatically trigger creation of the group. This group may be generated on a social media platform.

In some examples, taking the picture with the camera may automatically create a social media event, or may provide an interactive user interface element that allows a user to create a social media event. In some examples, an interactive user interface element may be generated that allows a recognized person to add a friend to the created group. In some examples, stories added to the generated collaborative group may be automatically archived in each of the group members' personal data archives.

In some examples, the method may further include receiving, at a later time, a subsequent story that is to be added to the collaborative group storyline, and then presenting the collaborative group storyline to the persons in the group, along with the subsequent story. In some examples, the method may further include determining that the electronic device is in a new location. The method may next include presenting an indication on a user interface of the electronic device noting the new location, and then automatically generating a story related to the new location.

In some examples, one of the recognized persons in the group may determine which persons outside of the group will have access to the collaborative group storyline. In some examples, a subsequently taken picture may be automatically added to the generated collaborative group storyline. In some examples, the collaborative group storyline may allow members of the group to add to the group storyline using stories generated by the group members.

In addition, a corresponding system for creating a social media application group by taking a picture may include several modules stored in memory, including an input receiving module for receiving an input indicating that a picture is to be taken using a camera on an electronic device.

The system may also include a camera that allows a picture to be taken which includes picture data. Still further, the system may include a facial recognition module that accesses the picture data to recognize persons in the picture based on facial features associated with the persons. The system may also include a group creation module that creates a group for the recognized persons, and a storyline generator that generates a collaborative group storyline for the created group that allows members of the group to add stories to the collaborative group storyline.

In some examples, the above-described method may be encoded as computer-readable instructions on a computer-readable medium. For example, a computer-readable medium may include one or more computer-executable instructions that, when executed by at least one processor of a computing device, may cause the computing device to receive an input indicating that a picture is to be taken using a camera on an electronic device. The computing device may next take the picture with the camera, and store the associated picture data. Next, the computing device may access the picture data to recognize the persons in the picture based on facial features associated with those persons. Still further, the computing device may create a group for the recognized persons, where the group is associated with the picture taken by the camera, and may generate a collaborative group storyline for the created group that allows members of the group to add stories to the collaborative group storyline.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
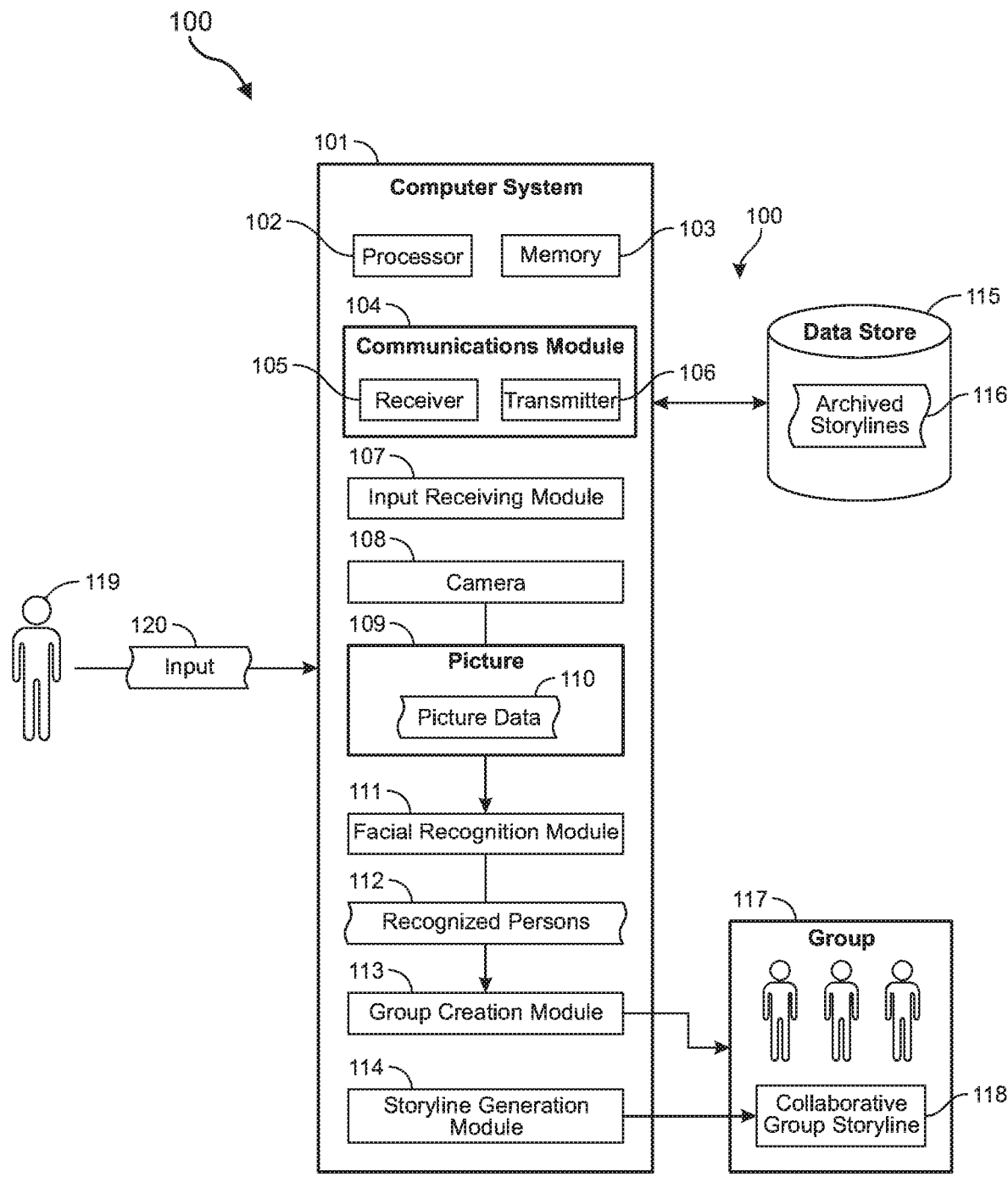
FIG. 1 illustrates a computer architecture in which the embodiments described herein may be performed including creating a social media application group by taking a picture.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to creating a social media application group by taking a picture. As will be explained in greater detail below, embodiments of the instant disclosure may create a social media application group by taking a picture. These embodiments may include receiving an input indicating that a picture is to be taken using a camera on an electronic device, then taking the picture with the camera, and storing the associated picture data. Next, the embodiments may include accessing the picture data to recognize the persons in the picture based on facial features associated with those persons. Still further, the embodiments may include creating a group for the recognized persons, where the group is associated with the picture taken by the camera. The embodiments may further include generating a collaborative group storyline for the created group that allows members of the group to add stories to the collaborative group storyline.

In traditional social media applications, if a user wants to create a group, the user must manually sift through a list of contacts and select those that are to be part of the group. In doing so, the user may inadvertently select contacts that were not intended to be part of the group, or may omit contacts that were intended to be part of the group. In the embodiments herein, instead of needing to present a list of contacts to the user, the user's device can generate the group automatically without user input. For instance, the user can simply take a picture, and the user's electronic device (or perhaps a remote computing system) can perform facial recognition on the persons that are in the picture. Once the persons have been recognized and have been tied to identities (perhaps within a social media application), those identified persons may be added to the newly created group. The picture that was taken may automatically be added to the group. As such, everyone that was in the picture has access to that group picture. In this manner, multiple steps of selecting group members, creating a group, and then sharing the photo with the group no longer have to be performed by the user. Avoiding this lengthy process saves multiple processing resources including CPU cycles, memory space, and battery power. Moreover, friends can easily share pictures and moments with those people that were involved in the moment, without the fear of selecting members that do not belong in the group. Still further, the group and associated storyline can be created without the user having to remove themselves from the moment, and the user can simply enjoy taking a picture with friends.

The following will provide, with reference to FIGS. 1-8, detailed descriptions of methods and systems that create a social media application group simply by taking a picture. FIG. 1, for example, illustrates a computing architecture 100 in which many of the embodiments described herein may operate. The computing architecture 100 may include a computer system 101. The computer system 101 may include at least one processor 102 and at least some system memory 103. The computer system 101 may be any type of local or distributed computer system, including a cloud computer system. The computer system 101 may include program modules for performing a variety of different functions. The program modules may be hardware-based, software-based, or may include a combination of hardware and software. Each program module may use or represent computing hardware and/or software to perform specified functions, including those described herein below.

For example, communications module 104 may be configured to communicate with other computer systems. The communications module 104 may include any wired or wireless communication means that can receive and/or transmit data to or from other computer systems. These communication means may include radios including, for example, a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 may be configured to interact with databases, mobile computing devices (such as mobile phones or tablets), embedded systems, or other types of computing systems.

The computer system 101 further includes an input receiving module 107, which may be the same as or different than receiver 105. The input receiving module 107 may receive input 120 from user 119. The input may indicate, for example, that a picture is to be taken using camera 108. In some embodiments, the computer system 101 is a mobile device such as a phone, tablet, laptop or watch. The mobile device may have one or more cameras 108 that capture pictures 109. The cameras may be forward-facing, rearward-facing, two-dimensional or three-dimensional cameras. Upon receiving such an input 120, the camera 108 may take a picture 109 (or a series of pictures). Each picture 109 has associated picture data 110. The picture data 110 may be fed to a facial recognition module 111 that performs facial recognition on the subjects of the picture. The facial recognition module 111 may use machine learning, neural networks, or any combination of software and hardware to perform the facial recognition. The facial recognition module 111 may identify facial features or other characteristics that are unique to a given individual. These identified characteristics or features may be compared to a bank of stored features for known users. If the features or characteristics match the known users, then those users will be recognized in the picture 109.

Once the recognized persons 112 have been identified, the group creation module 113 may generate a group 117 that includes those people. In some scenarios, the facial recognition module 111 may be able to recognize every person in the picture 109, and add them to the group 117. In other cases, the facial recognition module 111 may only recognize some of the people in the picture 109, and will add those recognized persons 112 to the group. Other, unrecognized users may be added to the group by one of the recognized persons 112. The storyline generation module 114 may be configured to generate a collaborative group storyline 118 that is made available to the members of the group 117. The collaborative group storyline 118 may include the initial picture 109, and may allow the group members to add their own media (including videos, pictures, gifs, audio or text) to the storyline. Thus, as will be explained further below with regard to FIGS. 2-8, a user may create a social media group and associated storyline simply by taking a picture.

Figure 2:
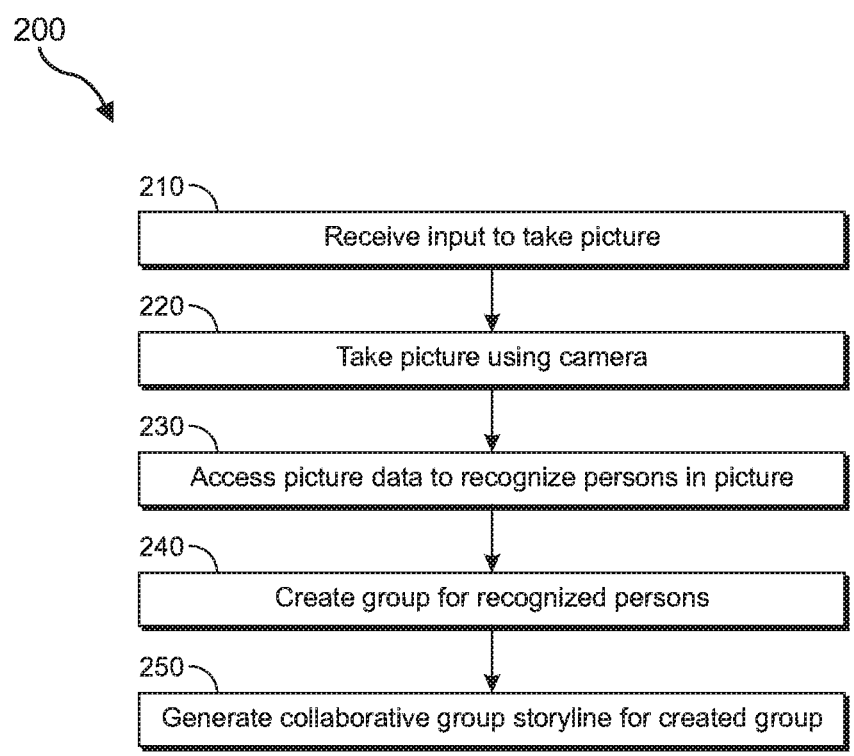
FIG. 2 illustrates a flow diagram of an exemplary method for creating a social media application group by taking a picture.

FIG. 2 is a flow diagram of an exemplary computer-implemented method 200 for creating a social media application group by taking a picture. The steps shown in FIG. 2 may be performed by any suitable computer-executable code and/or computing system, including the system(s) illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210 one or more of the systems described herein may receive an input indicating that a picture is to be taken using a camera on an electronic device. For example, user 119 of FIG. 1 may provide an input 120 indicating that camera 108 is to be used to take a picture. The input may be a touch input, a button press, a vocal command, or other form of input. In response to receiving the input 120, the camera 108 may take a picture 109 at step 220, and the computer system may store the picture data 110 associated with the picture in memory 103 and/or in data store 115. The picture data 110 may include color information for each pixel, as well as ex-if information including the time, location, type of camera, etc. Any or all of this information may be used when performing facial recognition on the subjects of the picture 109.

The method 200 may next include accessing the picture data 111 to recognize the persons in the picture 109 based on facial features associated with those persons at step 230. In some cases, data store 115 (or some other remote or local data store) may retain information about certain users, including their names (or usernames), facial features, or other characteristics that can be used to identify them. When the facial recognition module 111 performs facial recognition, it can scan the picture data 110 and identify certain facial features for each person in the picture. The facial recognition module 111 may then compare the identified facial features (or other characteristics) to those that were previously stored. If sufficient overlap exists between the identified facial features and the stored facial features, then the facial recognition module 111 may indicate that a match has been found (i.e., that a person has been identified).

Once the persons in the picture 112 have been recognized, the group creation module 113 may create a group for those persons at step 240. The group 117 may be associated with the picture 109 taken by the camera 108. The group may include each of the people recognized in the picture, and may omit those persons that are not recognized. The computer system 101 may be further configured to check, for each person recognized in the picture, whether those persons are part of a given social network. If some or all of the persons in the picture are part of a given social network, then the group creation module 113 may create a group within that social network. If the persons in the picture 112 are not members of a social network, or are members of different social networks, the group creation module 113 may create a separate group that is outside of a social network. Such a group may include members of different social networks, and may itself be a part of a social network, or may be part of no social network.

The storyline generation module 114 of computer system 101 may then generate a collaborative group storyline 118 for the group 117 at step 250. The storyline generation module 114 may create the collaborative group storyline 118 for the users of group 117 and any other users that are invited to the group. The collaborative group storyline 118 may allow the members of the group to post pictures, videos, audio, text, emoticons, stickers, links or other media to the storyline. As each media item or other portion of feedback is received from the group members, it may be posted chronologically in the storyline. Thus, each group member can view the original picture 109, as well as any storyline comments based on the picture.

Accordingly, a group of users may be at an event such as a concert or party, or may be at a given location such as the Grand Canyon or New York City, and may take a picture as a group. The action of taking a picture may trigger creation of a group and a collaborative group storyline for that group, once the users have been recognized. The users may then post their own pictures from the party or from the Grand Canyon, and view other group member's pictures as well. In this manner, groups of users, such as families or friends, may experience an event or place together, and may be able to easily share content related to that place or event together with those family or friends that were there sharing in the experience. Traditional steps of the user identifying members to be added to a group, initiating creation of the group, and creating a storyline for the group need not be done. All the user needs to do is take a picture. The increase in ease of use when interacting with the computer system 101 may be substantial. Instead of the user having to pull themselves out of the moment to perform these tasks, they are performed automatically upon taking the picture.

In some embodiments, creation of a collaborative group storyline may be an option that is presented to the user when taking a picture. For example, when the user opens a camera application or other application that allows pictures to be taken, the computer system 101 may present a prompt to receive user input (e.g., 120) querying whether a collaborative group storyline is to be created. At this point, the user can decide whether to create a storyline or not. If the user wants to create a storyline, the user may provide an input indicating such. This input may then be received by the input receiving module 107. The storyline generation module 114 may then generate a collaborative group storyline in response to the received user input 120. Thus, not every picture taken by the user needs to result in the creation of a group, or the creation of a collaborative group storyline. In some embodiments, the user may be prompted before such actions occur, or may only be prompted in certain situations. For example, the computer system 101 may be configured to detect whether people are present in the picture (either before the picture is taken or after the picture is taken). If people are present in the picture, the user may be prompted to allow group/storyline creation, whereas if no people are detected in the picture, the prompt may be omitted.

In some embodiments, the computer system 101 may present a prompt to receive user input querying whether people are to be recognized from the picture data. In some cases, the user taking the picture may not want people to be recognized in the picture. The prompt presented to the user may allow the user to allow or prevent the computer system 101 from performing facial recognition on the people in the picture. If the user replies in the affirmative to the prompt, the facial recognition module 111 will perform facial recognition on the people in the picture, and identify people in the picture based on facial features associated with those people.

Figure 3:
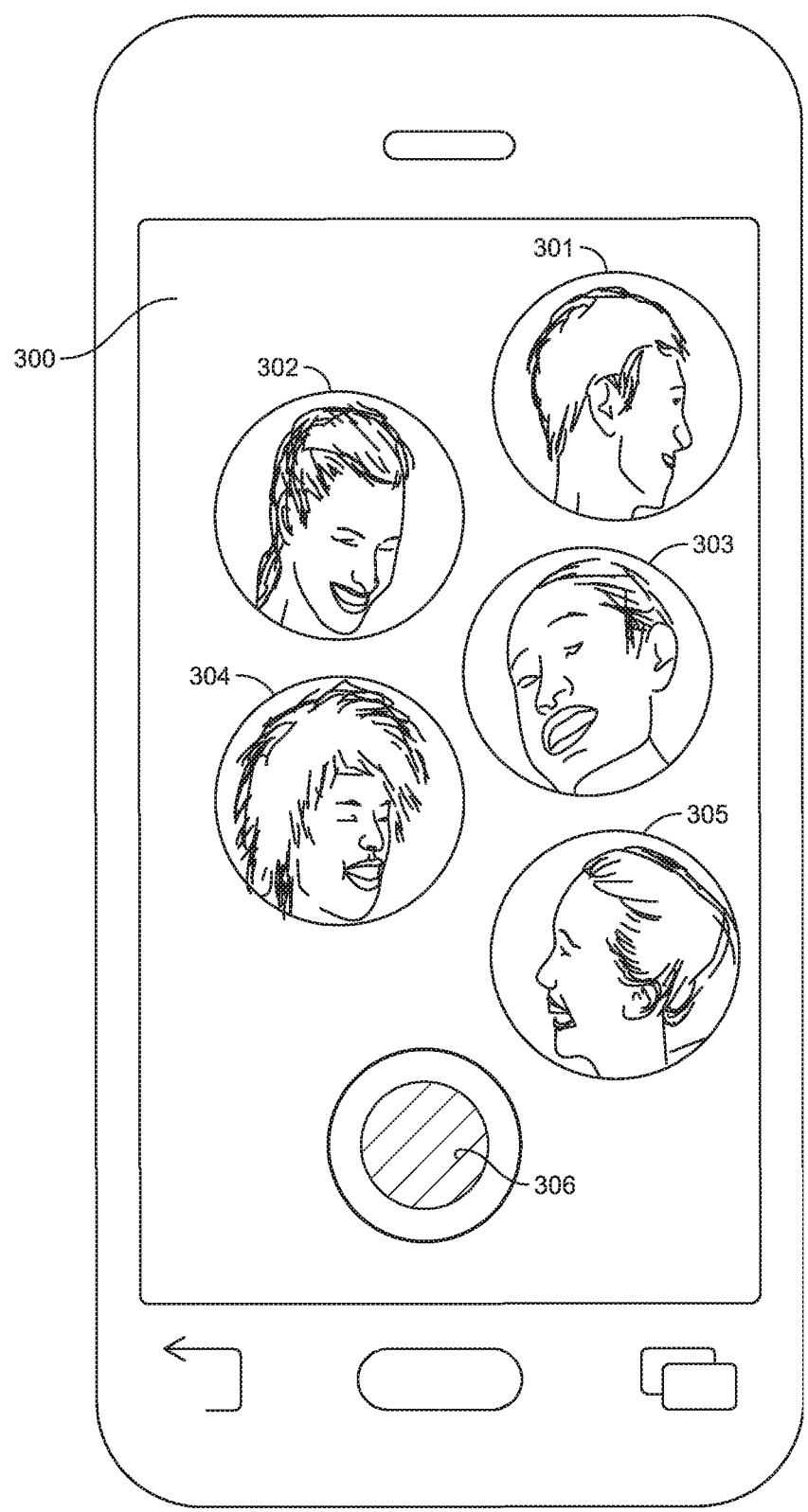
FIG. 3 illustrates an embodiment of a user interface for creating a social media application group by taking a picture.
Figure 4:
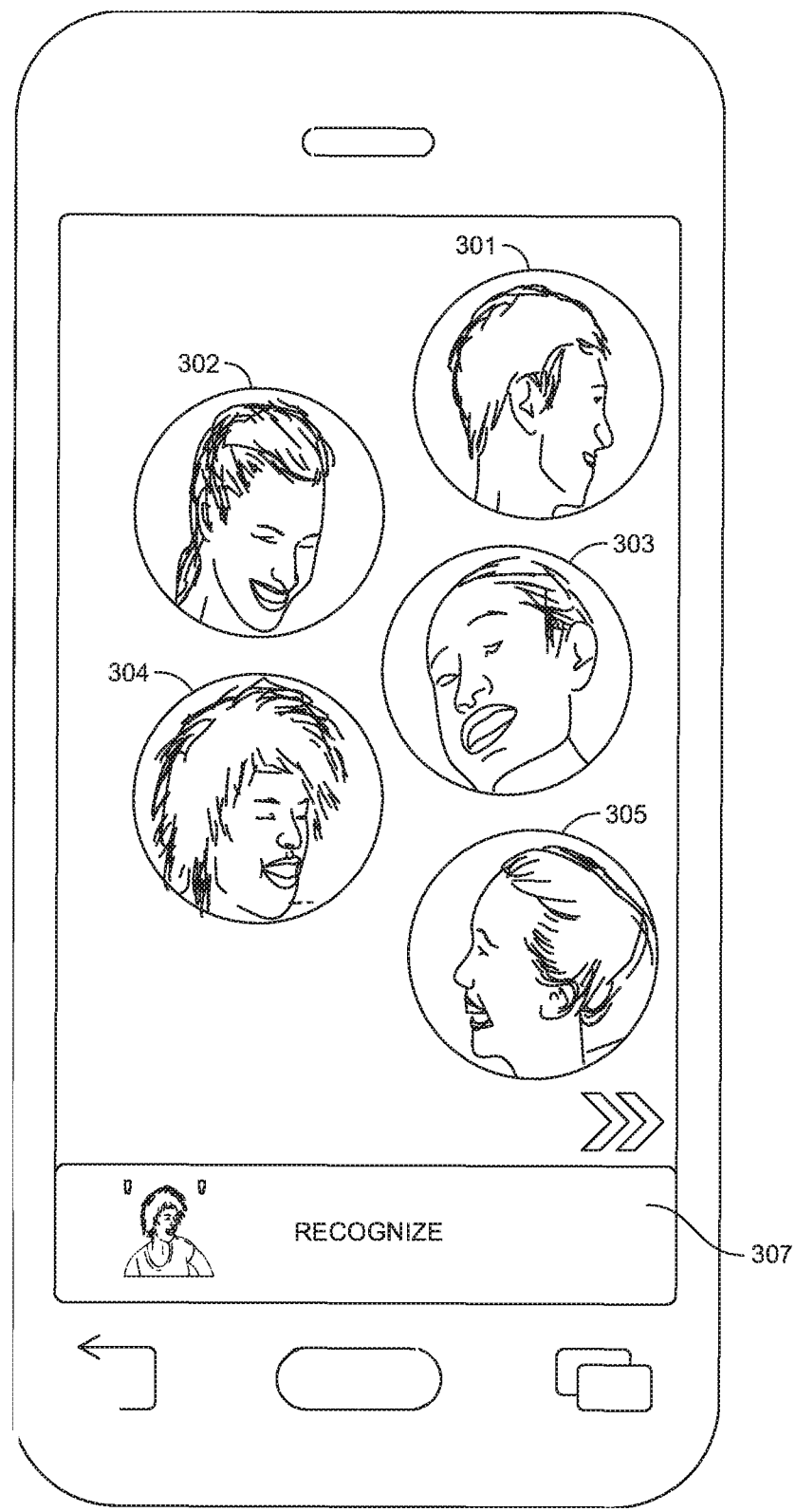
FIG. 4 illustrates an alternative embodiment of a user interface for creating a social media application group by taking a picture.

In some cases, the processor 102 of computer system 101 may determine whether some of the recognized people 112 are friends of the user who initiated the picture. For instance, as shown in FIG. 3, a user may click button 306 of user interface 300 to take a picture. In the picture of FIG. 3, the camera has identified five different faces: 301-305. These people may be recognized automatically, or the user may be presented with a prompt to recognize the people. For instance, if user 301 took the picture, they may be given a prompt 307 in FIG. 4 to perform facial recognition on users 302-305. Once the users are recognized, the computer system 101 may determine whether any of the recognized users is a friend of user 301. For example, computer system 101 may look to social media platforms or applications, contact lists, recent phone calls, recent text messages, or may look to other sources of information to determine whether the recognized users are friends (or family) of the user. Additionally or alternatively, the computer system 101 may determine whether the recognized users are members of a social media platform. Using this information, the computer system may use the social media identities associated with the recognized users to form a group.

Figure 5:
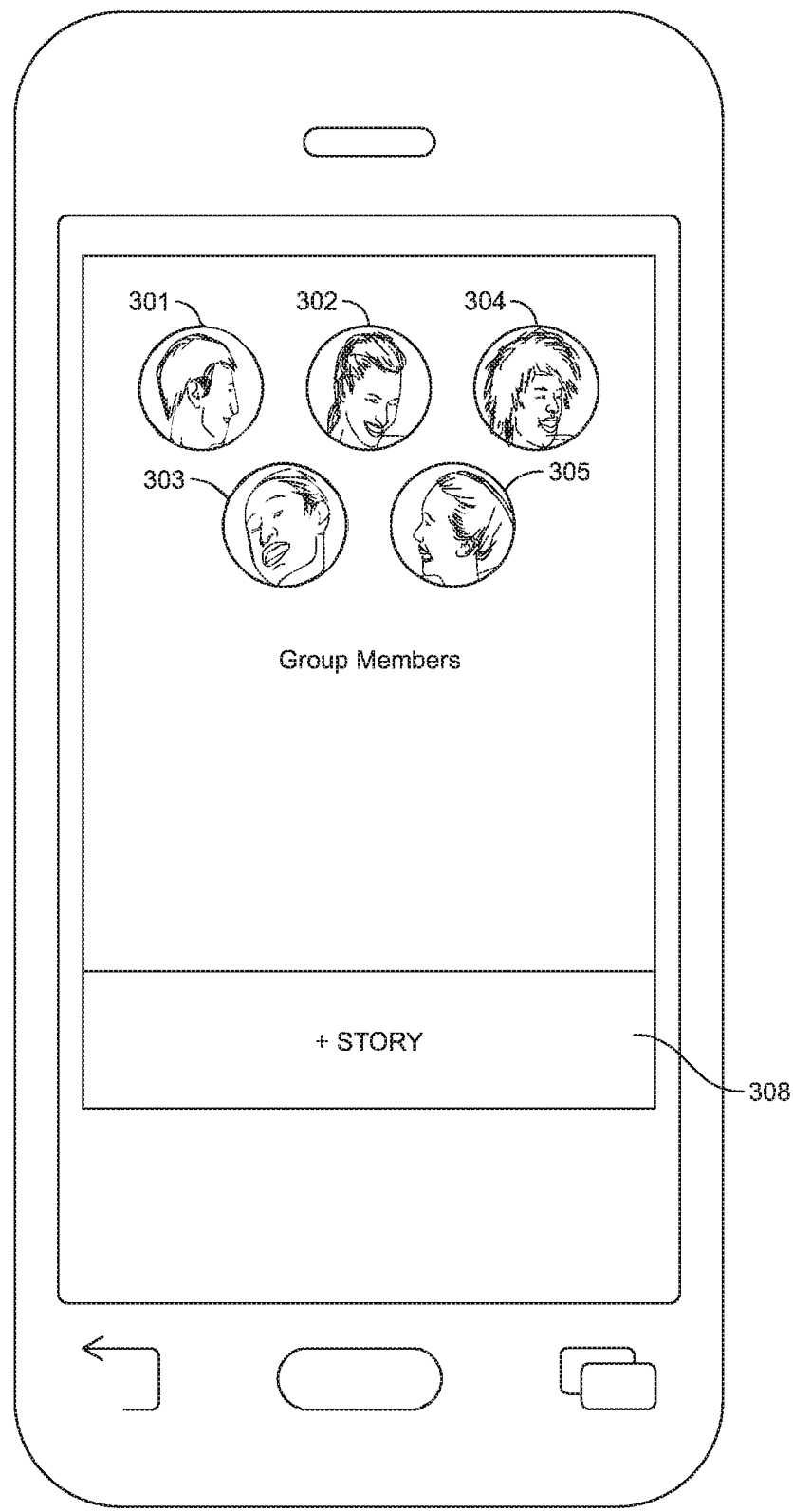
FIG. 5 illustrates an alternative embodiment of a user interface for creating a social media application group by taking a picture.
Figure 6:
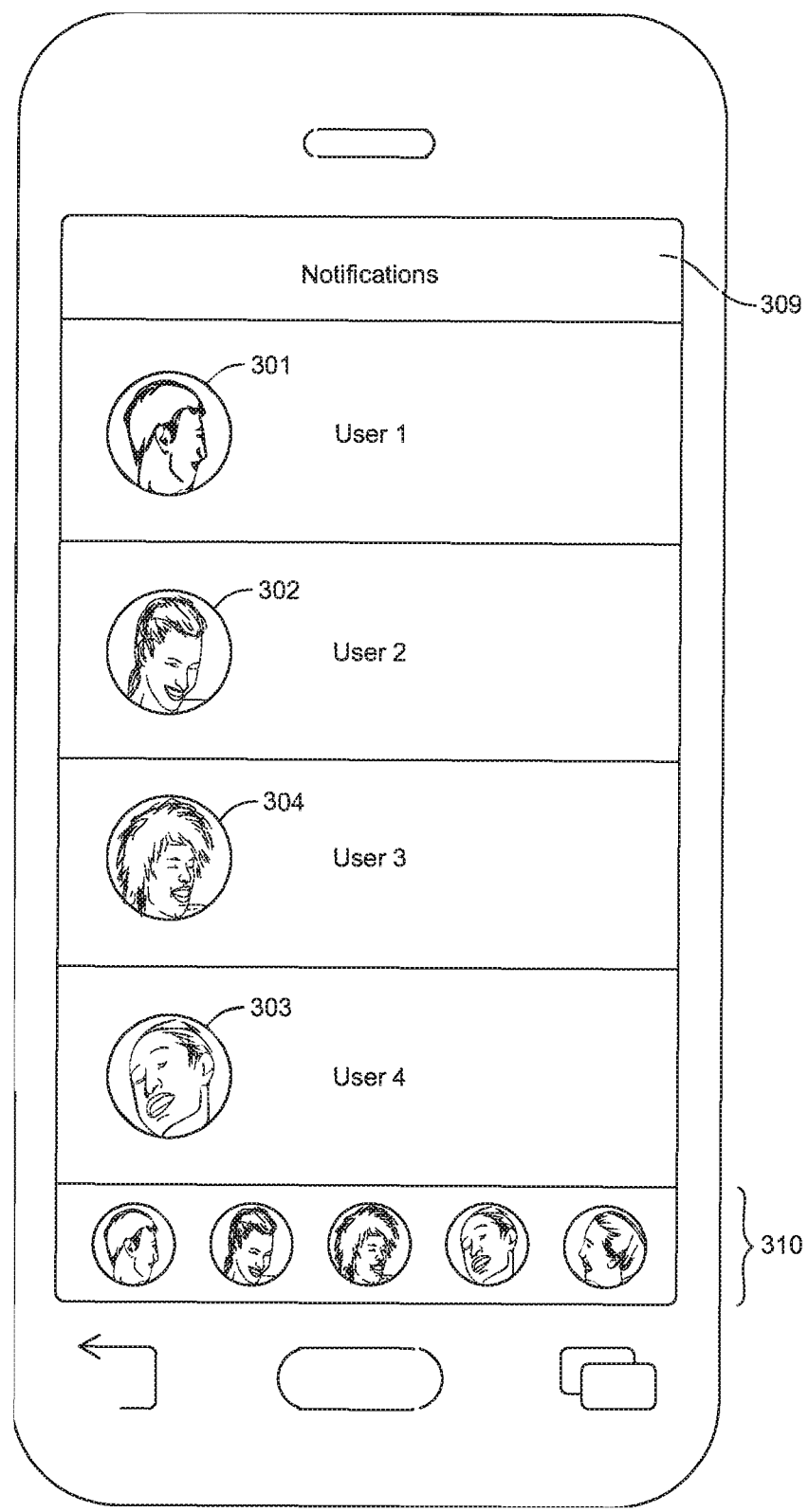
FIG. 6 illustrates an alternative embodiment of a user interface for creating a social media application group by taking a picture.
Figure 7:
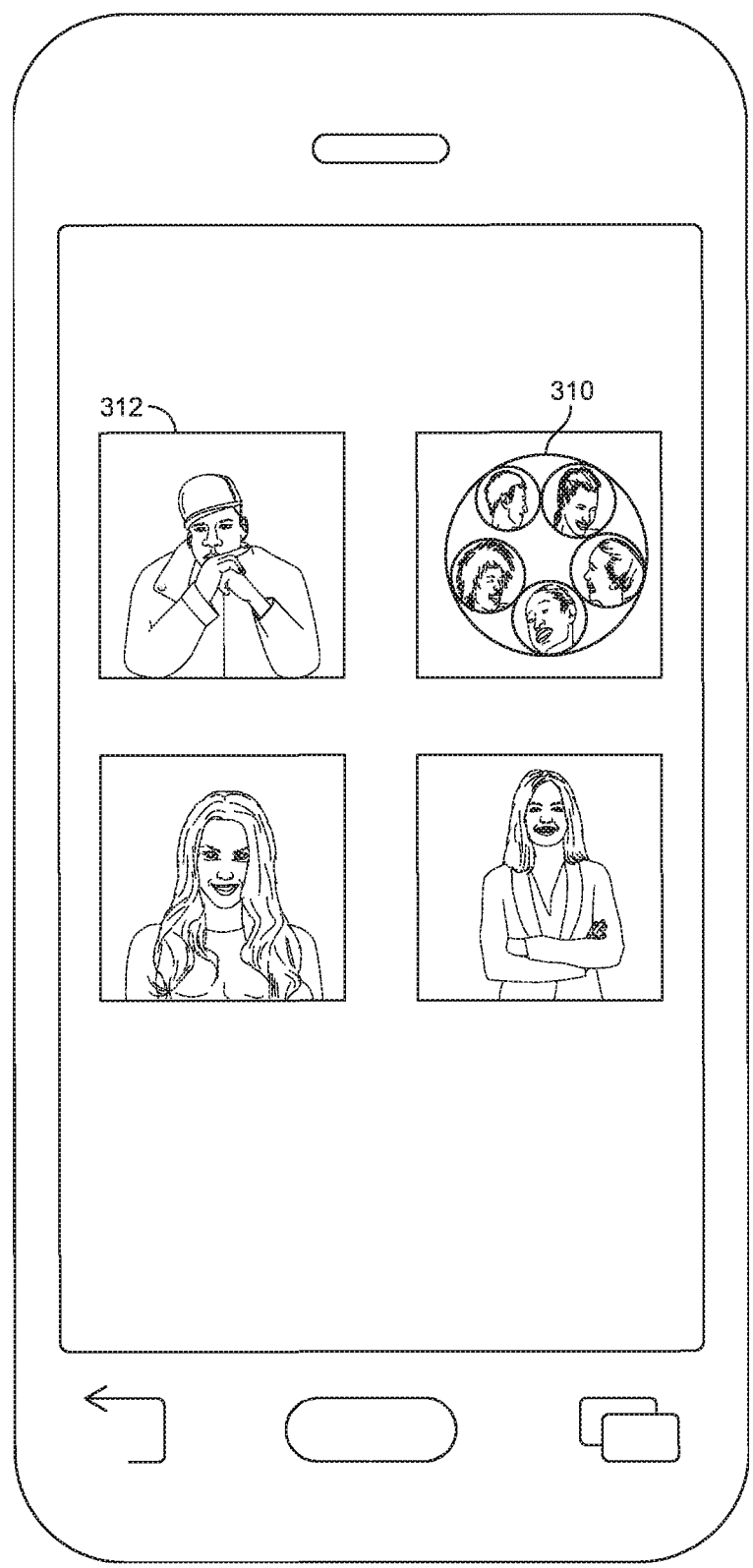
FIG. 7 illustrates an alternative embodiment of a user interface for creating a social media application group by taking a picture.
Figure 8:
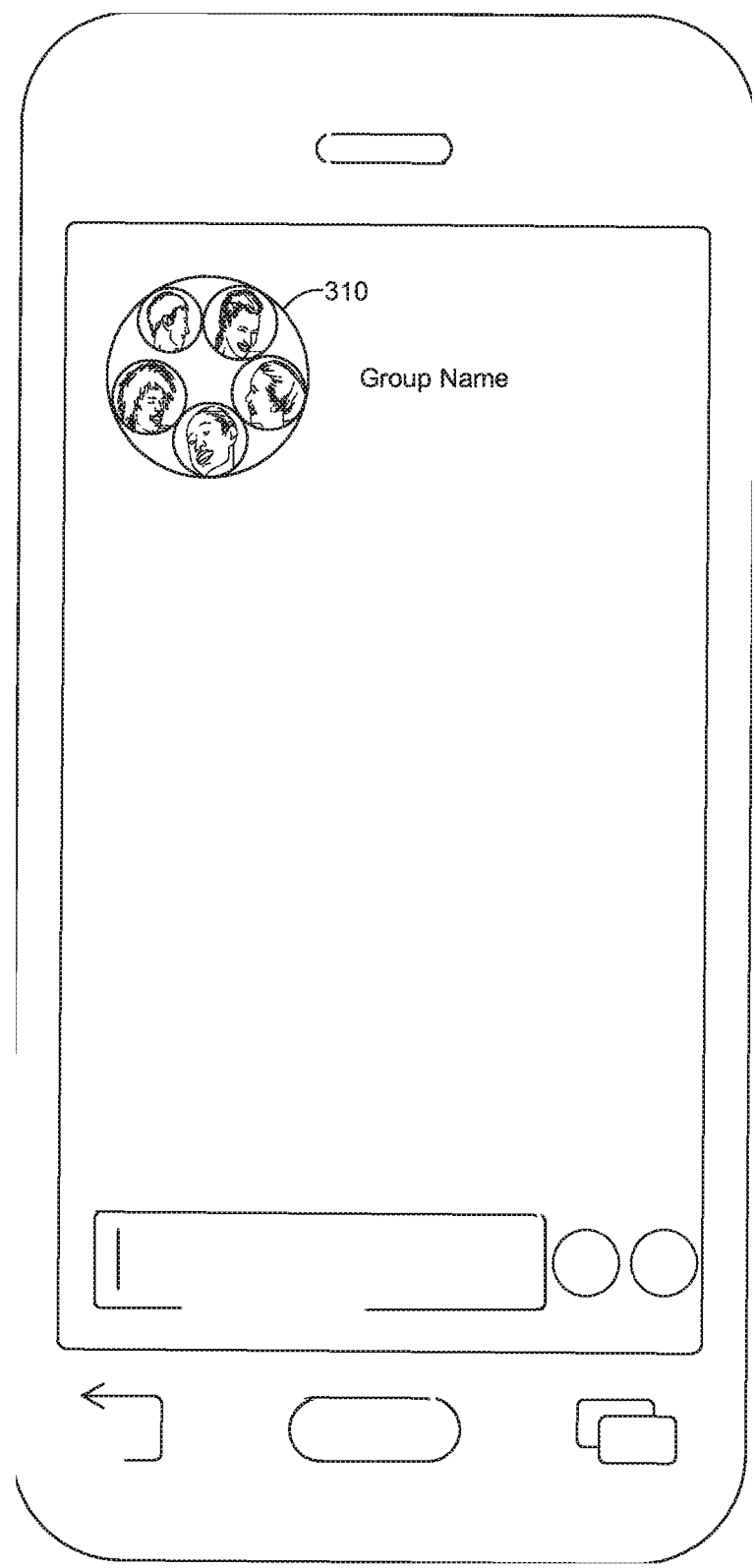
FIG. 8 illustrates an alternative embodiment of a user interface for creating a social media application group by taking a picture.

As shown in FIG. 5, the recognized users may be put in a group, and the user may be presented with a prompt 308 to create a story or storyline. In some embodiments, creation of a group is automatic, while in other cases, the user may approve of or prevent creation of a group using the prompt 308. When a group is created, and an associated storyline is created (perhaps with the original picture as its first story). Each of the users in the group may receive a notification about the storyline. Indeed, each member of the group 310 in FIG. 6 may receive a notification 309 indicating that a storyline has been created for the group. Each user may open an interface, such as that shown in FIG. 7, that allows users to view stories of their friends, family or other users. For example, in FIG. 7, the user can see four stories (or four users with stories). The first user 312 has his own story, while the group 310 has their own story which can be selected. Upon selecting the icon for the group 310, the user can add their own story content to the collaborative group storyline, as shown in FIG. 8. The user can use text bars, buttons or other UI elements to add media or other content to the group story. As noted above, each recognized person in the picture may be permitted to add a story to the collaborative group storyline, or make other additions to the group storyline.

In some cases, friends of the recognized persons in the picture may be permitted to see the collaborative group storyline. For example, those that were recognized in the picture (e.g., users 301-305) may each invite one or more friends to see the collaborative group storyline. In other cases, a policy or setting may be put in place which allows friends of those in the picture to view the storyline. In some cases, each recognized person in the image may be permitted to choose which friends to allow to see the collaborative group storyline. Each person may select those with whom the collaborative group storyline is to be shared. Each person invited to the storyline may see the initial image taken by the camera, which was, at least in some cases, automatically established as a profile picture for the group. Upon selecting the image or an associated link, the invited users may view and interact with the collaborative group storyline if permitted to do so.

Other policies or settings may also be put in place which govern the list of users that are allowed to view and/or comment on the collaborative group storyline. For instance, in one embodiment, at least one level of friends beyond the recognized users' friends may be permitted to view and/or comment on the collaborative group storyline. Other levels of friends, family, or degrees of separation may be used to specify who can or cannot view and/or comment on the storyline created from the picture.

In addition to creating a group and/or associated storyline, taking a picture with the camera may also automatically create a social media event. The event may be an annual gathering, for example, where each year the group of friends gets together. Or, the event may be a party with which the picture is associated. Many different types of social media events may be generated as a result of taking the picture. Still further, taking a picture with the camera may cause the computer system 101 to provide an interactive user interface element that allows a user to create a social media event. In some cases, an interactive user interface element (such as a button or prompt) may be generated that allows a recognized person to add a friend to the created group. Other user interface elements may allow a user to archive a given storyline. Indeed, as shown in FIG. 1, archived storylines 116 may be stored in data store 115. Stories that are added to the generated collaborative group 118 may be automatically archived in each of the group members' personal data archives. Accordingly, the archived storylines may be stored together in a single data store, or may be stored separately in each group members' personal data stores.

In some embodiments, users may post stories at a later point in time. For example, the group of users (e.g., 310) may get together and take another picture, perhaps a year after the original picture. This subsequent picture may result in a new story being added to the existing collaborative group storyline 118. Indeed, the computer system 101 may recognize that a group already exists for the users in the subsequent picture, and may identify that group (e.g., group 310). The computer system may then store the subsequently-received story with the existing collaborative group storyline. The users of the group may then be notified that a subsequent story has been added to the group storyline. In some cases, if the picture is taken in a new location, the computer system may take note of the new location, and present an indication on a user interface identifying the new location. The computer system 101 may then automatically generate a story related to the new location. This may be a new story that is added to the existing collaborative group storyline, or may be added to a new storyline.

Thus, in this manner, the collaborative group storyline 118 may be a continually growing storyline that may be added to at later times by members of the group. In some cases, other users may be invited to add to the storyline. For instance, as noted above, one of the recognized persons in the group may determine which persons outside of the group will have access to the collaborative group storyline. Thus, initial members of the group along with invited members may add to the group storyline using stories generated by the group members and the invitees.

It should be noted that, at least in some embodiments, other actions may trigger facial recognition, group creation, and collaborative group storyline generation. For instance, a user may initiate a video, or may open a camera application. In the case of a video, the facial recognition module 111 may be configured to identify users in real time as the video is being taken, or may be configured to take a still image from the video and perform facial recognition on the still image. Upon identifying the users in the video, the group creation module 113 and storyline generation module may create a group and associated storyline for the users identified in the video, similar to the method described above in conjunction with taking a picture. Similarly, in some cases, the mere opening of a camera or other photo-taking application may initiate the process of performing facial recognition on the subjects in the camera's view, creating a group and creating a corresponding storyline.

In addition, a corresponding system (e.g., 100 of FIG. 1) for creating a social media application group by taking a picture may include several modules stored in memory, including an input receiving module 107 for receiving an input indicating that a picture is to be taken using a camera on an electronic device. The system may also include a camera 108 that allows a picture to be taken which includes picture data. Still further, the system may include a facial recognition module 111 that accesses the picture data to recognize persons in the picture based on facial features associated with the persons. The system may also include a group creation module 113 that creates a group for the recognized persons, and a storyline generation module 114 that generates a collaborative group storyline for the created group that allows members of the group to add stories to the collaborative group storyline.

In some examples, the above-described method may be encoded as computer-readable instructions on a computer-readable medium. For example, a computer-readable medium may include one or more computer-executable instructions that, when executed by at least one processor of a computing device, may cause the computing device to receive an input indicating that a picture is to be taken using a camera on an electronic device. The computing device may next take the picture with the camera, and store the associated picture data. Next, the computing device may access the picture data to recognize the persons in the picture based on facial features associated with those persons. Still further, the computing device may create a group for the recognized persons, where the group is associated with the picture taken by the camera, and may generate a collaborative group storyline for the created group that allows members of the group to add stories to the collaborative group storyline.

Accordingly, methods and systems are provided which allow a user to initiate many different tasks just by taking a picture. Previously unlinked and tedious tasks may now be performed simply and efficiently by a user taking a picture. Users can feel free to enjoy their moments with friends, and allow the methods and systems described herein to perform facial recognition, create a group, and create a storyline to go along with the group. The users in the photo (and other invitees) may view the photo, and may add their own commentaries in storyline-based feedback. These stories are then stored in conjunction with the group, and in conjunction with the original photo taken by the user.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to perform a function, use the result of the transformation to perform a function, and store the result of the transformation to perform a function. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

I claim:

1. A computer-implemented method comprising:
   receiving an input indicating that a video is to be captured using a camera on an electronic device;
   initiating the video with the camera, the video comprising video data;
   accessing the video data to recognize one or more persons in the video based one or more facial features associated with the one or more persons;
   subsequent to initiating the video, automatically creating a group for the one or more recognized persons in the video, the group including those one or more persons that were recognized in the video captured by the camera; and
   generating a collaborative group storyline for the created group that allows members of the group to add stories to the collaborative group storyline.

2. The computer-implemented method of claim 1, further comprising:
   presenting a prompt to receive user input querying whether the collaborative group storyline is to be created;
   receiving user input indicating that the collaborative group storyline is to be created; and
   generating the collaborative group storyline in response to the received user input.

3. The computer-implemented method of claim 1, further comprising:
   presenting a prompt to receive user input querying whether persons are to be recognized from the video data;
   receiving user input indicating that one or more of the persons in the video are to be recognized; and
   recognizing the one or more persons in the video based on one or more facial features associated with those persons.

4. The computer-implemented method of claim 1, further comprising determining whether at least one of the recognized persons is a friend of a user who initiated the video.

5. The computer-implemented method of claim 1, wherein each recognized person in the video is permitted to add a story to the collaborative group storyline.

6. The computer-implemented method of claim 1, wherein a still frame from the video captured by the camera is automatically established as a profile picture for the created group.

7. The computer-implemented method of claim 1, wherein one or more friends of the recognized persons in the video are permitted to see the collaborative group storyline.

8. The computer-implemented method of claim 1, wherein each recognized person in the video is permitted to choose which friends to allow to see the collaborative group storyline.

9. The computer-implemented method of claim 1, wherein at least one level of friends beyond a recognized users' friends are permitted to view and/or comment on the collaborative group storyline.

10. The computer-implemented method of claim 1, wherein capturing the video with the camera automatically triggers creation of the group.

11. The computer-implemented method of claim 1, wherein capturing the video with the camera automatically creates a social media event, or provides an interactive user interface element that allows a user to create a social media event.

12. A system comprising:
at least one physical processor;
physical memory comprising computer-executable instructions that, when executed by the physical processor, cause the physical processor to:
receive an input indicating that a video is to be captured using a camera on an electronic device;
capture the video with the camera, the video comprising video data;
access the video data to recognize one or more persons in the video based one or more facial features associated with the one or more persons;
subsequent to capturing the video, automatically create a group for the one or more recognized persons in the video, the group including those one or more persons that were recognized the video captured by the camera; and
generate a collaborative group storyline for the created group that allows members of the group to add stories to the collaborative group storyline.

13. The system of claim 12, wherein the physical processor generates an interactive user interface element that allows a recognized person to add a friend to the created group.

14. The system of claim 12, wherein stories added to the generated collaborative group are automatically archived in each of the group members' personal data archives.

15. The system of claim 12, wherein the physical processor further:
receives, at a later time, a subsequent story that is to be added to the collaborative group storyline; and
presents the collaborative group storyline to the persons in the group, along with the subsequent story.

16. The system of claim 12, wherein the physical processor further:
determines that the electronic device is in a new location;
presents an indication on a user interface of the electronic device noting the new location; and
automatically generates a story related to the new location.

17. The system of claim 12, wherein one or more of the recognized persons in the group determines which persons outside of the group will have access to the collaborative group storyline.

18. The system of claim 12, wherein at least one subsequently captured video is automatically added to the generated collaborative group storyline.

19. The system of claim 12, wherein the collaborative group storyline allows members of the group to add to the group storyline using stories generated by the group members.

20. A non-transitory computer-readable medium comprising one or more computer-executable instructions that, when executed by at least one processor of a computing device, cause the computing device to:
receive an input indicating that a video is to be captured using a camera on an electronic device;
capture the video with the camera, the video comprising video data;
access the video data to recognize one or more persons in the video based one or more facial features associated with the one or more persons;
subsequent to capturing the video, automatically create a group for the one or more recognized persons in the video, the group including those one or more persons that were recognized in the video captured by the camera; and
generate a collaborative group storyline for the created group that allows members of the group to add stories to the collaborative group storyline.

* * * * *